United States Patent [19]
Kravitz

[11] Patent Number: 6,035,217
[45] Date of Patent: Mar. 7, 2000

[54] ONE BUTTON CELLULAR PHONE, SYSTEM, AND METHOD FOR USE

[75] Inventor: Scott Kravitz, San Francisco, Calif.

[73] Assignees: Sony Corporation of Japan, Tokyo, Japan; Sony Electronics, Inc., Park Ridge, N.J.

[21] Appl. No.: 08/960,293

[22] Filed: Oct. 29, 1997

[51] Int. Cl.[7] .............................. H04B 1/06; H04M 1/164; H04M 1/00

[52] U.S. Cl. .......................... 455/561; 455/90; 455/563; 379/88.03; 379/355; 379/368

[58] Field of Search .................................... 455/563, 564, 455/565, 575, 404, 403; 379/88.03, 216, 354, 355, 368

[56] References Cited

U.S. PATENT DOCUMENTS

| | | | |
|---|---|---|---|
| 5,221,121 | 6/1993 | Shimada ................................... | 455/563 |
| 5,487,108 | 1/1996 | Atkins et al. ............................ | 455/564 |
| 5,542,100 | 7/1996 | Hatakeyama ........................... | 455/56.1 |
| 5,544,130 | 8/1996 | Mizuno et al. .............................. | 369/1 |
| 5,555,286 | 9/1996 | Tendler ................................... | 455/563 |
| 5,609,508 | 3/1997 | Wingate ................................... | 449/142 |
| 5,659,597 | 8/1997 | Bareis et al. ............................ | 455/563 |
| 5,828,292 | 10/1998 | Kokhan ................................... | 455/404 |

*Primary Examiner*—Paul Loomis
*Attorney, Agent, or Firm*—Wagner, Murabito & Hao LLP

[57] ABSTRACT

The present invention provides a one button cellular phone that provides all basic phone functions using single button on the phone. The invention operates by the user pressing the single button to dial a service provider. The call then is answered by the service provider, thus connecting the single button cellular phone to the service provider. At this time, the user communicates a desired number to be called to the service provider. The service provider then connects the one button cellular phone to the desired number. The single button on the cellular phone can also be used to answer an incoming call and also to terminate a call in progress. The single button cellular phone of the present invention is easy to use and is especially advantageous for children, aged people and the disabled. By requiring only a single button and not the conventional 12 key keypad, the cellular phone of the present invention can be manufactured relatively small in size.

42 Claims, 6 Drawing Sheets

600

ONE BUTTON CELLULAR PHONE, SYSTEM, AND METHOD FOR USE

FIELD OF THE INVENTION

The present claimed invention relates to the field of wireless communication. More particularly, the present claimed invention relates to wireless communication utilizing a cellular telephone device.

BACKGROUND ART

Today, advances in wireless communication are making it possible to connect people everywhere. Wireless communication is overcoming barriers of distance and physical wires to provide instant point-to-point communication. As wireless communication becomes more affordable for more people, wireless communication devices have become almost indispensable for many people both on and off the road, at home and at work.

While the cellular communication devices (e.g., cellular phones) have become less expensive, they have not become much easier or simpler to use for a large segment of population. For example, placing a call through a cellular communication device can still present a daunting task for many children, the aged, and the physically and/or mentally disabled. This is especially true for young children who do not yet recognize numbers on the dialing keypad or the functions of the buttons on a cellular phone. Cellular communication devices have found increasing use among children. For instance, it is not uncommon for children to carry a pager. Indeed, some parents equip their child with a pager or even a cellular phone to maintain around the clock communication. On the other hand, dialing a number by pressing a series of buttons on a cellular phone can be a challenging task for the aged and the physically and/or mentally disabled people. For example, an aged person suffering from eye maladies may not be able to dial a number by sight. In this case, the only practical way for the person to dial would be to dial by memory and feel of the layout of the buttons on the cellular phone. Such a procedure in dialing a number would be very inconvenient.

Another drawback of the current cellular communication devices is the size of the devices. Because these devices are meant to be typically used as portable devices, people have demanded smaller cellular communication devices. Unfortunately however, the size of the cellular communication devices has been limited by the incorporation of the standard 12-key keypad into most devices. Although these 12 keys provide extra features and attendant convenience in communicating, they also define a lower limit on how small the cellular communication devices can be. That is, a cellular device or phone must be larger than the 12 keys it incorporates. In addition to these keys, a typical cellular phone includes more buttons to provide extra features to the users. For example, many cellular phones include buttons such as volume control button, on/off button, etc.

In an attempt to address some of these problems, a conventional cellular phone such as SOS Phone has included three buttons, an on/off button, and a pair of volume buttons for a total of six buttons. The first button is used for calling a live operator, who connects the user to a desired number. The second button is used t o call an emergency roadside service provider in case of an automobile related mishap. The third button connects the user to 911 emergency service. The on/off button is necessary to answer or hang up a call in the SOS phone.

The SOS Phone, however, still does not adequately address the problem s described above. First, young children still may not be able to distinguish the differences among three buttons to use it effectively. Second, children typically do not need the emergency roadside service provider button since they do not drive. Third, these three buttons and the three more buttons for on/off and volume control still present a limitation to the size of a cellular communication devices.

Thus, what is needed is a cellular communication device, method, and system that is easy to use for people of all ages, conditions, and technical savvy. In particular, what is needed is a cellular communication phone, system, and method that is easy to use for children or people who do not require or need complex features of conventional cellular phone system.

SUMMARY OF THE INVENTION

The present invention provides a one button cellular phone, system and method for use. The one button cellular phone comprises an antenna, a transmitter/receiver, control circuitry, a microphone, a speaker, a memory, a ringer, and a single button. The antenna transmits and receives voice and call signals. The transmitter/receiver is coupled to the antenna to transmit and receive the voice and call signals. The control circuitry is coupled to the transmitter/receiver for controlling the transmission and reception of the call and voice signals. The speaker is coupled to the control circuitry for amplifying the voice signals and the microphone is coupled to the control circuitry for receiving the voice signals from a user. The memory is coupled to the control circuitry for holding the number of a service provider. The single button, when pressed by a user, dials the number of the service provider stored in the memory. Then, the service provider connects the one button cellular phone to a desired number communicated by the user. The ringer signals an incoming call to the user so that when the user presses the single button, the incoming call is connected to the user on the one button cellular phone.

In another embodiment, the present invention also provides a method for making a call on a cellular phone having a single button. In this method, the user first presses the single button to dialing a service provider. The call is answered by the service provider, thus connecting the cellular phone to the service provider. The user communicates a desired number to be called to the service provider. The service provider then connects the one button cellular phone to the desired number. As described above, the single button on the cellular phone of the present invention can be used for call pick-up and call hang-up as well as call dialing.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

In the following detailed description of the present invention, a one button cellular phone, system and method for use, numerous specific details are set forth in order to provide a thorough understanding of the present invention. However, it will be obvious to one skilled in the art that the present invention may be practiced without these specific details. In other instances, well known methods, procedures, components, and circuits have not been described in detail so as not to unnecessarily obscure aspects of the present invention.

The present invention provides a one button cellular phone, system and method of use for performing the basic functions of many well known cellular phones. The simplicity in operation allows the one button cellular phone to be used by people of varying ages and conditions such as young children, the aged, and physically or mentally disabled people. Moreover, since the cellular phone of the present invention has only one button, it can be more readily miniaturized to enhance portability. For example, the one button cellular phone of the present invention can be worn around the neck as a necklace or the wrist like a watch, or placed into a pocket. The simplicity of use of the one button cellular phone thus allows even a young child to be in two-way communication with his or her guardian at all times.

Figure 1:
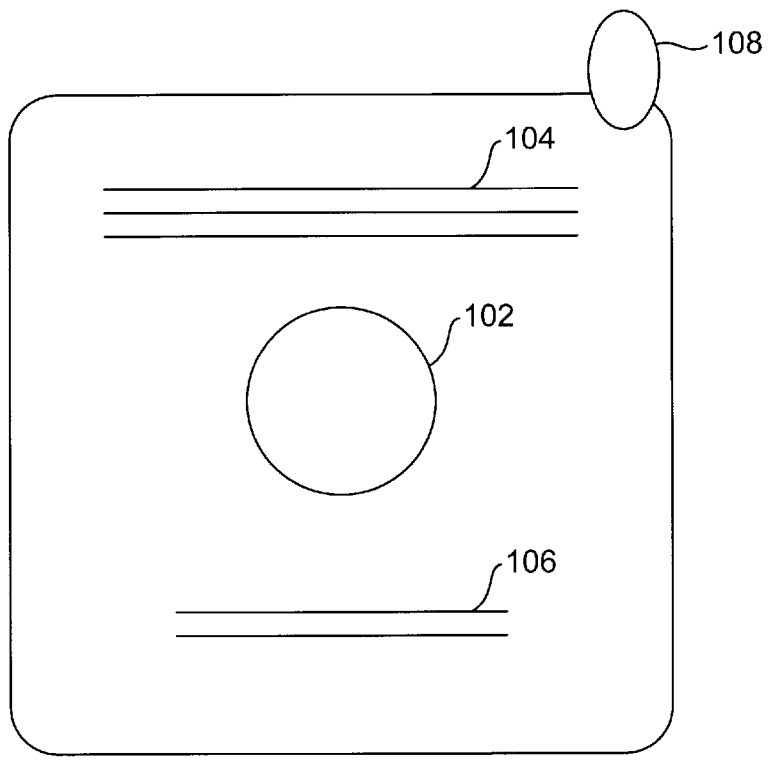
FIG. 1 illustrates an external view of an exemplary one button cellular phone in accordance with the present invention.

FIG. 1 illustrates an external view of an exemplary one button cellular phone 100 in accordance with the present invention. The one button cellular phone 100 features a single button 102, a speaker 104, a microphone 106, and an antenna 108. The single button 102 replaces the standard twelve button keypad found in conventional phones. The antenna 108 can be provided externally as shown in FIG. 1 or in an alternative embodiment it can be provided internally within the one button cellular phone 100.

Figure 2:
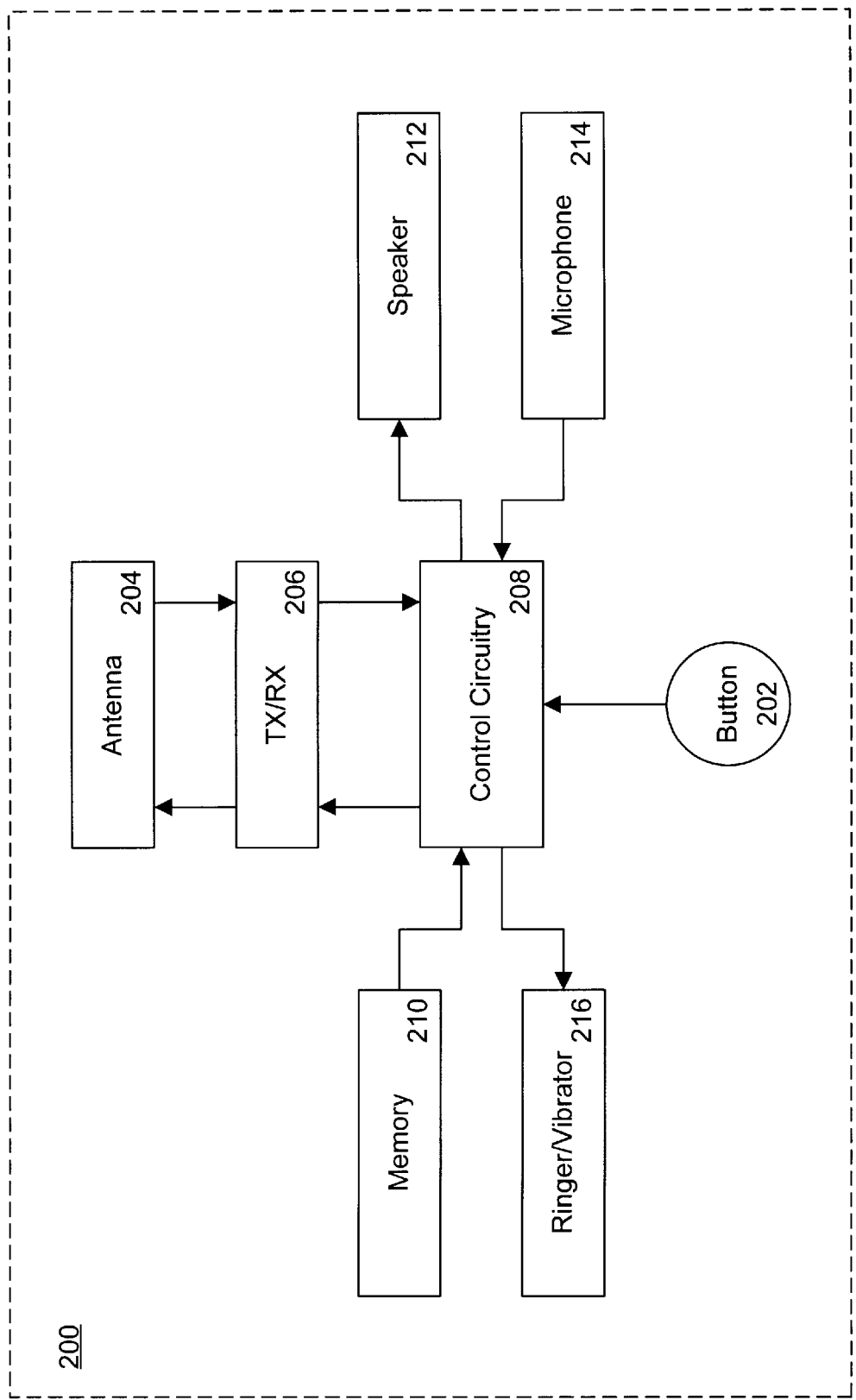
FIG. 2 shows a block diagram of the electronic circuitry of an exemplary one button cellular phone in accordance with the present invention.

FIG. 2 shows a block diagram of the electronic circuitry of an exemplary one button cellular phone 200. The one button cellular phone 200 includes a single button 202, control circuitry 208, a memory 210 (e.g., ROM), an antenna 204, a transmitter/receiver (TX/RX) 206, a speaker 212, a microphone 214, and a ringer/vibrator 216. The control circuitry 208 controls the transmission and reception of call and voice signals. During a transmission mode, the control circuitry 208 provides a voice signal from the microphone 214 to the TX/RX 206. The TX/RX 206 transmits the voice signal to a remote station (e.g., fixed station, operator, other cellular phones, etc.) for communication through the antenna 204. The ringer/vibrator 216 is coupled to the control circuitry 208 and is used to signal an incoming call to the user. In the present invention, the ringer/vibrator 216 can emit a ringing or buzzing sound and/or tactile vibrations to indicate an incoming call.

During a receiving mode, on the other hand, the TX/RX 206 of FIG. 2 receives a voice signal from a remote station (e.g., fixed station, operator, other cellular phones, etc.) through the antenna 204. The control circuitry 208 then provides the received voice signal from the TX/RX 206 to the speaker 212, which provides audible signals for the user's hearing. The memory 210 stores at least one number to a service provider that provides a number and access means to the one button cellular phone 200. It should be appreciated that even though the present invention is illustrated by way of the block diagram in FIG. 2, the present invention is equally suitable for various other cellular phone designs. Those skilled in the art will also recognize that the single button feature of the present invention can be implemented in any analog or digital cellular phones.

Figure 3:
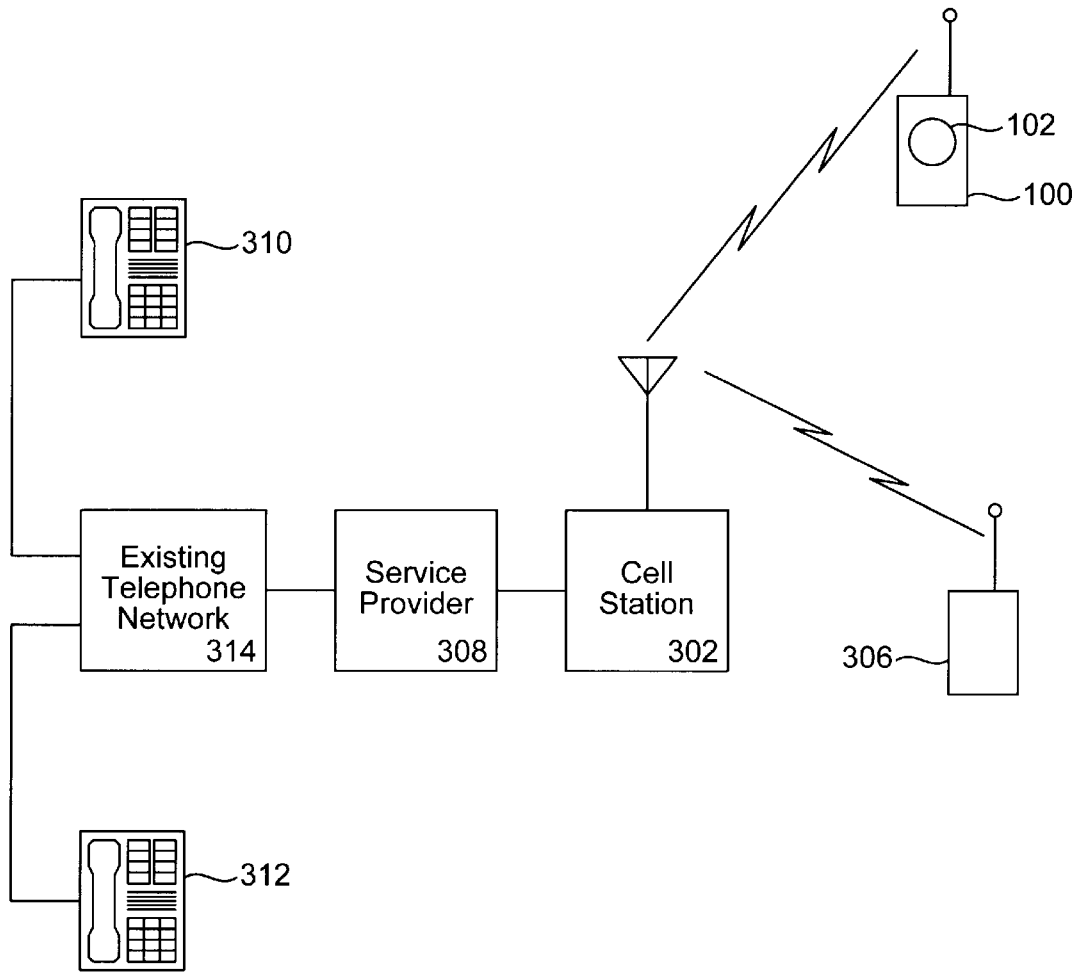
FIG. 3 illustrates a block diagram of a cellular communication system in accordance with the present invention.

In the present invention, the one button cellular phone 100 is used to call a service provider, who provides communication link to a desired number. FIG. 3 illustrates a block diagram of a cellular communication system 300 in accordance with the present invention. A one button cellular phone 100 including a single button 102 can communicate with any one of the phones 306, 310, and 312. To be connected to another phone, a user on the one button cellular phone 100 presses the single button 102. Pressing the single button 102 triggers control circuitry 208 within the one button cellular phone 100 to dials a number to a service provider 308 through a cell station 302 (e.g., fixed station, relay station, satellite station, etc.). In dialing the number to the service provider 308, the control circuitry 208 uses the number of the service provider stored in memory 210. The service provider 308 then provides a connection to phones 310 and 312 through an existing telephone network 314 or to the phone 306 through its own cell station 302 or network.

Conversely, the phones 310 and 312 can place a call to the one button cellular phone 100 through the existing telephone network 314, the service provider 308, and the cell station 302. The phone 306 can call the one button cellular phone 100 through the cell station 302 and the service provider 308. The user on the one button cellular phone 100 end needs to press the single button 102 to answer the call. In this manner, the communication link between the one button cellular phone 100 and any of the phones 310, 312, and 306 can be established.

Figure 4:
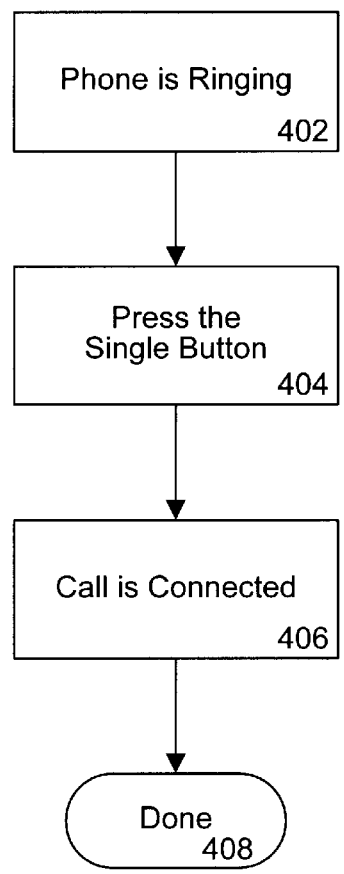
FIG. 4 illustrates a flow chart of the steps involved in answering a call on the one button cellular phone of the present invention.
Figure 5:
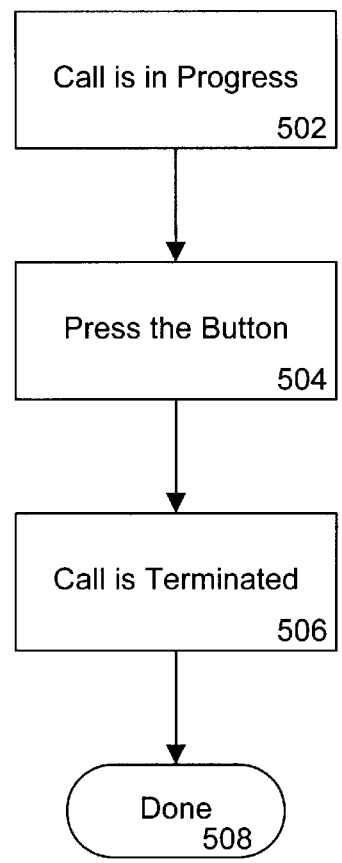
FIG. 5 shows a flow diagram of the steps involved in terminating a call on the one button cellular phone.
Figure 6:
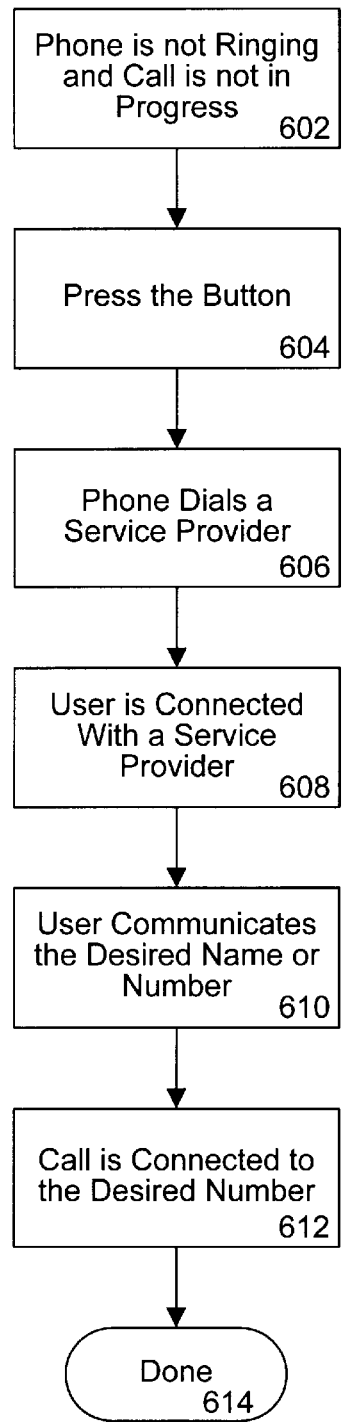
FIG. 6 illustrates a flow chart of the steps involved in making a call on the one button cellular phone in accordance with the present invention.

The present invention enables a user to use only a single button 102 to perform all basic phone functions. These basic phone functions include making or initiating a call, answering a call, and terminating a call. FIGS. 4 through 6 illustrate flow diagrams of the steps involved in performing these basic phone functions in accordance with the present invention.

FIG. 4 illustrates a flow chart 400 of the steps involved in answering a call on the one button cellular phone 100 of the present invention. Initially in step 402, the cellular phone rings in response to a call. To answer the call, the user presses the single button 102 on the one button cellular phone 100 in step 404. Then in step 406, the call is connected to the user. The user can now engage in a conversation using the one button cellular phone 100. The answering process 400 terminates in step 408.

FIG. 5 shows a flow diagram 500 of the steps involved in terminating a call on the one button cellular phone 100 of the present invention. In step 502, a call is initially in progress. To end the call, the user presses the single button 102 on the one button cellular phone 100 in step 504. In step 506, the call is terminated. This process 500 terminates in step 508.

FIG. 6 illustrates a flow chart 600 of the steps involved in making a call through the one button cellular phone 100 of the present invention. In order to place a call, the one button cellular phone 100 is typically not in use. That is, the one button cellular phone 100 is not ringing and a call is not in progress as indicated in step 602. To make the call, the user presses the single button 102 on the one button cellular phone 100 in step 604. In response, the cellular phone 100 accesses memory 210 to dial a service provider in step 606. The number of the service provider is stored in the memory 210 as depicted in FIG. 2. Hence, whenever the single button 102 is pressed to make a call, the one button cellular phone 100 automatically retrieves the service provider's number stored in the memory 210 and dials the number. In one embodiment of the present invention, the one button cellular phone 100 can thus dial only one number directly.

When the call is answered by the service provider, the user is now connected with the service provider as in step 608 of FIG. 6. The service provider is one who provides the number associated with the one button cellular phone 100 and/or connection to other phones. In the present invention, the service provider can be either an automatic voice-recognition device or a live operator. When the service provider is an automatic voice-recognition device, the user can be connected to a live operator by simply speaking the word "operator" into the one button cellular phone 100. The voice-recognition service provider then connects the user to a live operator, who becomes the service provider.

In step 610, after the user is connected with the service provider, the user communicates a desired number to the service provider by speaking the number to be called into the microphone 214 of the one button cellular phone 100. In the alternative, the user may identify a preset word or a name associated with the desired number by speaking the word or the name into the one button cellular phone 100. This speed dialing feature expedites connection to frequently called numbers. Then in step 612, the service provider recognizes the name or the number and dials the requested number or number associated with the desired name. The user is now connected to the desired number. The call placing process 600 terminates in step 614.

The one button cellular phone 100 of the present invention also provides security features to prevent unauthorized access. For example, a PIN (personal-identification-number) code may be used to prevent an unauthorized user from calling any numbers other than the preset numbers. Hence, the service provider can require a user to communicate, by speaking into the one button cellular phone 100, a PIN code before placing a call to any numbers other than the preset numbers. If the PIN code matches the PIN code in the service provider's record or database, then the user is allowed to continue by identifying a desired number to call. The service provider then dials the number for the user. Although the preferred embodiment of the present invention allows a user to call the preset numbers without a PIN code, it can also require a PIN code prior to allowing the user to call the preset numbers. The PIN code security feature can be implemented with either the voice-recognition device or live operator as the service provider. In an alternative embodiment, a password may be used instead of the PIN code as a security feature to prevent unauthorized access. The password feature operates in a similar manner as the PIN code.

In accordance with the present invention, implementing the speed dialing and security features such as PIN code and password can require an introductory session between the user and the service provider. In this introductory session, the user sets up an account with the service provider. In particular, the service provider assigns a number to the one button cellular phone 100. The user, on the other hand, provides a PIN code or a password for security and the words or names and their associated numbers to be preset for speed dialing.

For example, the user may provide his or her home number and associate the number with a word such as "Home." Hence, when the user wishes to call Home, he or she merely utters the word "Home," into the microphone 214 of the one button cellular phone 100 of the present invention. This introductory session can be conducted in person with a live operator or with a voice-recognition device. During this session, the user may be prompted to speak all those numbers and words associated with the preset numbers in order to train the voice-recognition device in recognizing the user's voice. In this manner, the voice recognition device can more efficiently recognize the numbers and words spoken by the user. After the introductory session, the one button cellular phone 100 of the present invention is fully operational with all the features described above. In addition, when the one button cellular phone 100 is in use, the caller ID function automatically forwards its phone number to the service provider. Hence, the service provider knows the exact phone for which it is providing the service.

The present invention, a one button cellular phone, system, and method for use, is thus described. While the present invention has been described in particular embodiments, it should be appreciated that the present invention should not be construed as being limited by such embodiments, but rather construed according to the claims below.

What is claimed is:

1. A method of using a cellular phone for communicating with a wireless communication system comprising the steps of:
   (1) placing a call to any one phone number of a plurality of telephones coupled to said wireless communication system by using a single button on a one button cellular phone, said step (1) further comprising the steps of:
   (2) terminating a call with the phone of said wireless communication system by pressing the single button of the one button cellular phone; and
   (3) receiving a call from a phone of said wireless communication system by pressing the single button of the cellular phone in response to an incoming call signal.

2. The method as recited in claim 1 wherein step (1) further comprises the steps of:
   (a) pressing the single button causing the cellular phone to dial a predetermined number of the service provider;
   (b) connecting the cellular phone to the service provider;
   (c) when the service provider answers, a user communicating a number to be placed by the service provider; and
   (d) the service provider placing a call to the number and connecting the one button cellular phone to the number to establish the communication link between the cellular phone and another phone.

3. The method as recited in claim 2 wherein the user communicates the number to be called by speaking the number into a microphone of the one button cellular phone.

4. The method as recited in claim 2 wherein the user communicates the number to be called by speaking a preset word associated with the number into a microphone of the one button cellular phone.

5. The method as recited in claim 2 wherein the service provider is a voice-recognition device which can recognize spoken words and numbers.

6. The method as recited in claim 2 wherein the service provider is a live operator.

7. The method as recited in claim 2 further comprising the step of providing, by the user, a personal-identification-number (PIN) to the service provider in advance of the communicating step (c) wherein the service provider allows the user to continue only when the PIN matches an authorized PIN.

8. The method as recited in claim 2 further comprising the step of providing, by the user, a password to the service provider in advance of the communicating step (c) wherein the service provider allows the user to continue only when the password matches an authorized password.

9. The method as recited in claim 2 wherein the single button pressing step (a) further comprises the steps of:
  accessing a memory in the one button cellular phone, said memory containing the predetermined number of the service provider; and
  dialing the predetermined number of the service provider.

10. A method for making a communication link using a one button cellular phone having a single button, said comprising the steps of:
  (a) pressing the single button causing the cellular phone to dial a predetermined number of a service provider;
  (b) connecting the cellular phone to the service provider;
  (c) when the service provider answers, a user communicating a desired number to be called by the service provider, wherein said desired number is any one of a plurality of phone numbers; and
  (d) the service provider placing a call to the desired number and connecting the one button cellular phone to the desired number to establish the communication link between the cellular phone and another phone.

11. The method as recited in claim 10 wherein the user communicates the desired number to be called by speaking the number into a microphone of the one button cellular phone.

12. The method as recited in claim 10 wherein the user communicates the desired number to be called by speaking a preset word associated with the desired number into a microphone of the one button cellular phone.

13. The method as recited in claim 10 wherein the service provider is a voice-recognition device which can recognize spoken words and numbers.

14. The method as recited in claim 10 wherein the service provider is a live operator.

15. The method as recited in claim 10 further comprising the step of providing, by the user, a personal-identification-number (PIN) to the service provider in advance of the communicating step (c) wherein the service provider allows the user to continue only when the PIN matches an authorized PIN.

16. The method as recited in claim 10 further comprising the step of providing, by the user, a password to the service provider in advance of the communicating step (c) wherein the service provider allows the user to continue only when the password matches an authorized password.

17. The method as recited in claim 10 further comprising the step of pressing the single button of the one button cellular phone for terminating the communication link.

18. The method as recited in claim 10 wherein the single button pressing step (a) further comprises the steps of:
  accessing a memory in the one button cellular phone, said memory containing a number to the service provider; and
  dialing the number to the service provider.

19. The method as recited in claim 17 further comprising the step of pressing the single button of the one button cellular phone to receive a call from another phone in response to an incoming call signal.

20. A one button cellular phone comprising:
  an antenna for transmitting and receiving call and voice signals;
  a transmitter/receiver coupled to the antenna for transmitting and receiving the call and voice signals;
  control circuitry coupled to the transmitter/receiver for controlling the transmission and reception of the call and voice signals;
  a speaker coupled to the control circuitry for amplifying the call and voice signals;
  a microphone coupled to the control circuitry for receiving the voice signals from a user;
  a memory coupled to the control circuitry for holding a phone number of a service provider;
  a single button for triggering the control circuitry to dial the number of the service provider stored in the memory wherein the service provider answers and places another call to connect the one button cellular phone to a desired phone number as communicated by a user; and
  a ringer for signaling an incoming call to the user wherein pressing the button answers a call when the ringer signals the incoming call.

21. The phone as recited in claim 20 wherein the control circuit allows the user to communicate the desired number to be called by speaking the number into the one button cellular phone.

22. The phone as recited in claim 20 wherein the control circuit allows the user to communicates the desired number to be called by speaking a preset word associated with the desired number.

23. The phone as recited in claim 20 wherein the service provider is a voice-recognition device which can recognize spoken words and numbers.

24. The phone as recited in claim 20 wherein the service provider is a live operator.

25. The phone as recited in claim 20 wherein the control circuit allows the user communicate an authorized personal-identification-number (PIN) to the service provider to place a call.

26. The phone as recited in claim 20 wherein the control circuit allows the user communicate an authorized password to the service provider to place a call.

27. The phone as recited in claim 20 wherein the control circuit hangs up the one button cellular phone when the single button is pressed while the one button cellular phone is connected to a call.

28. The phone as recited in claim 20 wherein the control circuit establishes a communication link when the single button is pressed in response to an incoming call signal from a phone.

29. A one button cellular communication system comprising:
  a service provider; and
  a cellular phone comprising
    an antenna for transmitting and receiving call and voice signals;
    a transmitter/receiver coupled to the antenna for transmitting and receiving the call and voice signals;
    control circuitry coupled to the transmitter/receiver for controlling the transmission and reception of the call and voice signals;
    a speaker coupled to the control circuitry for amplifying the call and voice signals;
    a microphone coupled to the control circuitry for receiving the voice signals from a user;
    a memory coupled to the control circuitry for holding a phone number of the service provider;
    a single button for triggering the control circuitry to dial the number of the service provider stored in the memory wherein the service provider answers and places a call to a desired phone number as communicated by a user by connecting the one button cellular phone to the desired phone number, wherein said desired phone number is any one of a plurality of phone numbers; and a ringer for signaling an incoming call to the user wherein pressing the button answers a call when the ringer signals the incoming call.

30. The phone as recited in claim 29 wherein the control circuit allows the user to communicate the desired number to be called by speaking the number into the one button cellular phone.

31. The phone as recited in claim 29 wherein the control circuit allows the user to communicates the desired number to be called by speaking a preset word associated with the desired number.

32. The phone as recited in claim 29 wherein the service provider is a voice-recognition device which can recognize spoken words and numbers.

33. The phone as recited in claim 29 wherein the service provider is a live operator.

34. The phone as recited in claim 29 wherein the control circuit allows the user communicate an authorized personal-identification-number (PIN) to the service provider to place a call.

35. The phone as recited in claim 29 wherein the control circuit allows the user communicate an authorized password to the service provider to place a call.

36. The phone as recited in claim 29 wherein the control circuit hangs up the one button cellular phone when the single button is pressed while the one button cellular phone is connected to a call.

37. The phone as recited in claim 29 wherein the control circuit establishes a communication link when the single button is pressed in response to an incoming call signal from a phone.

38. A wireless communication device comprising:

a transmitter/receiver coupled to an antenna for transmitting and receiving call and voice signals;

control circuitry coupled to the transmitter/receiver for controlling transmission and reception of call and voice signals;

a speaker coupled to the control circuitry for rendering call and voice signals audible;

a microphone coupled to the control circuitry for receiving voice signals; and a single button operable to cause the control circuitry to initiate an outgoing call to any one of a plurality of telephone numbers, the single button also operable to cause the control circuitry to answer an incoming call, the single button further operable to cause the control circuitry to terminate an on-going call.

39. A wireless communication device as recited in claim 38 further comprising a memory coupled to the control circuitry for holding a phone number of the service provider.

40. A wireless communication device as recited in claim 38 wherein the control circuitry initiates the outgoing call upon pressing the single button.

41. A wireless communication device as recited in claim 38 wherein the control circuitry answers the incoming call upon pressing the single button in response to an incoming call signal.

42. A wireless communication device as recited in claim 38 wherein the control circuitry terminates the on-going call upon depression of the single button.

* * * * *